(12) United States Patent
Tang et al.

(10) Patent No.: US 7,761,691 B2
(45) Date of Patent: Jul. 20, 2010

(54) METHOD FOR ALLOCATING REGISTERS USING SIMULATED ANNEALING CONTROLLED INSTRUCTION SCHEDULING

(75) Inventors: Chung-Lin Tang, Jhudong Township, Hsinchu County (TW); Yung-Chia Lin, Taipei (TW); Jenq-Kuen Lee, Tainan (TW)

(73) Assignee: National Tsing Hua University, Hsinchu (TW)

( * ) Notice: Subject to any disclaimer, the term of this patent is extended or adjusted under 35 U.S.C. 154(b) by 93 days.

(21) Appl. No.: 11/260,722

(22) Filed: Oct. 27, 2005

(65) Prior Publication Data
US 2007/0101320 A1    May 3, 2007

(51) Int. Cl.
*G06F 12/02*    (2006.01)
(52) U.S. Cl. .................. 712/217; 712/214; 712/215; 712/216; 712/218; 712/219
(58) Field of Classification Search .................. 712/1, 712/213, 215, 24, 244, 18, 203, 216; 717/149, 717/161, 160; 714/2
See application file for complete search history.

(56) References Cited

U.S. PATENT DOCUMENTS

| | | | |
|---|---|---|---|
| 4,571,678 A | | 2/1986 | Chaitin |
| 4,992,938 A | * | 2/1991 | Cocke et al. ................. 712/217 |
| 5,347,639 A | * | 9/1994 | Rechtschaffen et al. ..... 712/203 |
| 5,408,658 A | * | 4/1995 | Rechtschaffen et al. ..... 712/216 |
| 5,519,841 A | * | 5/1996 | Sager et al. ................. 711/202 |
| 5,758,051 A | * | 5/1998 | Moreno et al. ................. 714/2 |
| 5,802,386 A | * | 9/1998 | Kahle et al. .................... 712/23 |
| 5,913,049 A | * | 6/1999 | Shiell et al. .................. 712/215 |
| 6,092,175 A | * | 7/2000 | Levy et al. ...................... 712/23 |
| 6,240,328 B1 | | 5/2001 | LaLonde et al. |
| 6,457,173 B1 | * | 9/2002 | Gupta et al. ................. 717/149 |
| 6,507,947 B1 | * | 1/2003 | Schreiber et al. ............ 717/160 |
| 6,826,677 B2 | * | 11/2004 | Topham ...................... 712/217 |
| 6,832,370 B1 | * | 12/2004 | Srinivasan et al. ........... 717/161 |
| 6,976,150 B1 | * | 12/2005 | Uht et al. ....................... 712/18 |

(Continued)

FOREIGN PATENT DOCUMENTS

TW    200404257    3/2004

OTHER PUBLICATIONS

Cormen et al. Introduction to Algorithms, 2001, MIT, first edition, pp. 138-141, 356-362, 595-599, and 636-640.*

(Continued)

*Primary Examiner*—Henry W. H. Tsai
*Assistant Examiner*—Cheng-Yuan Tseng
(74) *Attorney, Agent, or Firm*—Egbert Law Offices PLLC

(57) ABSTRACT

A method for scheduling instructions for clustered digital signal processors comprising a plurality of clusters, each cluster including at least two functional units and a first register file having a first unit, a second unit and a single set of access ports shared by the functional units comprises steps of checking whether executing one instruction needs data to be read from the first unit and the second unit of the first register file, generating a copying instruction to transfer data from the first unit to the second unit of the first register file, checking whether there is a prior operation cycle available to perform the copying instruction, scheduling the copying instruction in the prior operation cycle, and scheduling the instruction after the copying instruction.

2 Claims, 14 Drawing Sheets

U.S. PATENT DOCUMENTS

| | | | |
|---|---|---|---|
| 7,240,160 B1 * | 7/2007 | Hetherington et al. | 711/122 |
| 7,320,063 B1 * | 1/2008 | Grohoski et al. | 712/214 |
| 7,373,486 B2 * | 5/2008 | Lien et al. | 712/218 |
| 7,487,505 B2 * | 2/2009 | Rosenbluth et al. | 718/104 |
| 7,685,354 B1 * | 3/2010 | Hetherington et al. | 711/5 |
| 2004/0154006 A1 * | 8/2004 | Heishi et al. | 717/140 |
| 2006/0225061 A1 * | 10/2006 | Ludwig et al. | 717/161 |
| 2007/0038984 A1 * | 2/2007 | Gschwind et al. | 717/136 |

OTHER PUBLICATIONS

Touati, Registe Saturation in Superscalar and VLIW Codes, Springer-Verlag, 2001, pp. 213-228.*

Iyer et al. Extended Split-Issue:Enabling Flexibility in the Hardware Implementation of NUAL VLIW DSPs, 2004, IEEE Preceedings ISCA'04.*

Lapinskii, Cluster Assignment for High-Performance Embedded VLIW Processors, ACM Transactions on Design Automation of ELectronic Systems, vol. 7, No. 3, Jul. 2002, pp. 430-454.*

* cited by examiner

Pseudo-Operation Form

| | | | | |
|---|---|---|---|---|
| TN4 | = | addi | sp | ( sym : b+0 ) |
| TN3 | = | lw | TN4 | ( 0×0 ) |
| TN6 | = | addi | sp | ( sym : a+0 ) |
| TN5 | = | lw | TN6 | ( 0×0 ) |
| TN7 | = | add | TN3 | TN5 |
| TN8 | = | srai | TN7 | ( 0×2 ) |
| TN10 | = | fmuluu | TN3 | TN5 |
| TN11 | = | srli | TN3 | ( 0×10 ) |
| TN11 | = | fmulus | TN5 | TN11 |
| TN11 | = | slli | TN11 | ( 0×10 ) |
| TN10 | = | add | TN11 | TN10 |
| TN11 | = | srli | TN5 | ( 0×10 ) |
| TN11 | = | fmulus | TN3 | TN11 |
| TN11 | = | slli | TN11 | ( 0×10 ) |
| TN9 | = | add | TN11 | TN10 |
| TN12 | = | sub | TN8 | TN9 |
| TN13 | = | add | TN7 | TN12 |
| TN14 | = | movi.h | ( 0×0 ) | |
| TN14 | = | movi.l | ( 0×ff ) | |
| result | = | and | TN13 | TN14 |

FIG. 2

METHOD FOR ALLOCATING REGISTERS USING SIMULATED ANNEALING CONTROLLED INSTRUCTION SCHEDULING

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates to a method for allocating registers for clustered digital signal processors, and more particularly, to a method for scheduling instructions for clustered digital signal processors having multiple access-port restricted register files.

BACKGROUND OF THE INVENTION

Most computers contain a form of high performance data-storage elements called registers, which need to be used effectively to achieve high performance at runtime. The process of choosing language elements to allocate instructions to registers and the data movement required to use them is called "register allocation." Register allocation has a major impact on the ultimate quality and performance of codes. A poor allocation can degrade both code size and runtime performance. However, finding a truly optimal solution has been proven to be computationally intractable. Several general approaches for register allocation have been proposed. For example, register allocation by graph coloring was described by Chaitin, et al. in Computer Languages, Vol. 6, pp 47-57, and in U.S. Pat. No. 4,571,678 titled "Register Allocation and Spilling via Graph Coloring."

While there are register allocation algorithms to find good solutions in the prior art, they cannot directly apply to the machine that utilizes multiple register files having complex accessibility constraints because of the code insertion/replacement required in the register allocation to validate the code with the allocated registers. This impacts the complexity of register allocation problems in the machine.

BRIEF SUMMARY OF THE INVENTION

The objective of the present invention is to provide methods of scheduling instructions and allocating registers for clustered digital signal processors with multiple access-port restricted register files.

In order to achieve the above-mentioned objective and avoid the problems of the prior art, one embodiment of the present invention discloses a method for scheduling instructions for clustered digital signal processors comprising a plurality of clusters. Each cluster includes at least two functional units and a first register file having a first unit, a second unit and a single set of access ports shared by the functional units. The method for scheduling instructions comprises steps of checking whether execution of an instruction requires data to be read from the first and second units of the first register file, and generating a copying instruction to transfer data from the first unit to the second unit of the first register file if the checking result is true. In addition, the method further comprises steps of generating an additional virtual register assigned to the second unit of the first register file for receiving data transferred from the first unit of the first register file, and scheduling the instruction after the copying instruction. Further, the method may optionally comprise steps of checking whether there is a prior operation cycle available to perform the copying instruction, and scheduling the copying instruction in the prior operation cycle if there is an available prior operation cycle.

The method may comprise steps of checking whether the two functional units need to access the first register file in one operation cycle, and scheduling one of the two functional units to access the first register file before the other functional unit according to a predetermined priority based on types of operands if the checking result is true. In addition, the method may comprise steps of checking whether execution of an instruction requires data to be accessed from both the first and second clusters, generating a copying instruction to transfer data from the first cluster to the second cluster if the checking result is true, and scheduling the instruction after the copying instruction.

Further, in addition to the first register file, the cluster further comprises a second register file connected to the one functional unit, and a third register file connected to the other functional unit. The present invention also discloses a method for allocating registers comprising steps of: generating a plurality of instructions from programming codes; assigning a plurality of virtual registers to the first register file, the second register file, and the third register file to build an initial register file assignment map (RFA map); performing a scheduling process to calculate a first operation cycle for these instructions; performing a simulated annealing process to modify the register file assignment map; and allocating the virtual registers to the first register file, the second register file and the third register file according to the register file assignment map. The simulated annealing process comprises steps of: making at least one change in the register file assignment map; performing the scheduling process to calculate a second operation cycle for these instructions; checking whether the second operation cycle is smaller than the first operation cycle; and keeping the change in the register file assignment map if the checking result is true.

BRIEF DESCRIPTION OF THE SEVERAL VIEWS OF THE DRAWINGS

The objectives and advantages of the present invention will become apparent upon reading the following description and upon reference to the accompanying drawings.

FIG. 2 to FIG. 13 are graphic illustrations showing a method for scheduling instructions for the PAC DSP processor according to one embodiment of the present invention.

DETAILED DESCRIPTION OF THE INVENTION

Figure 1:
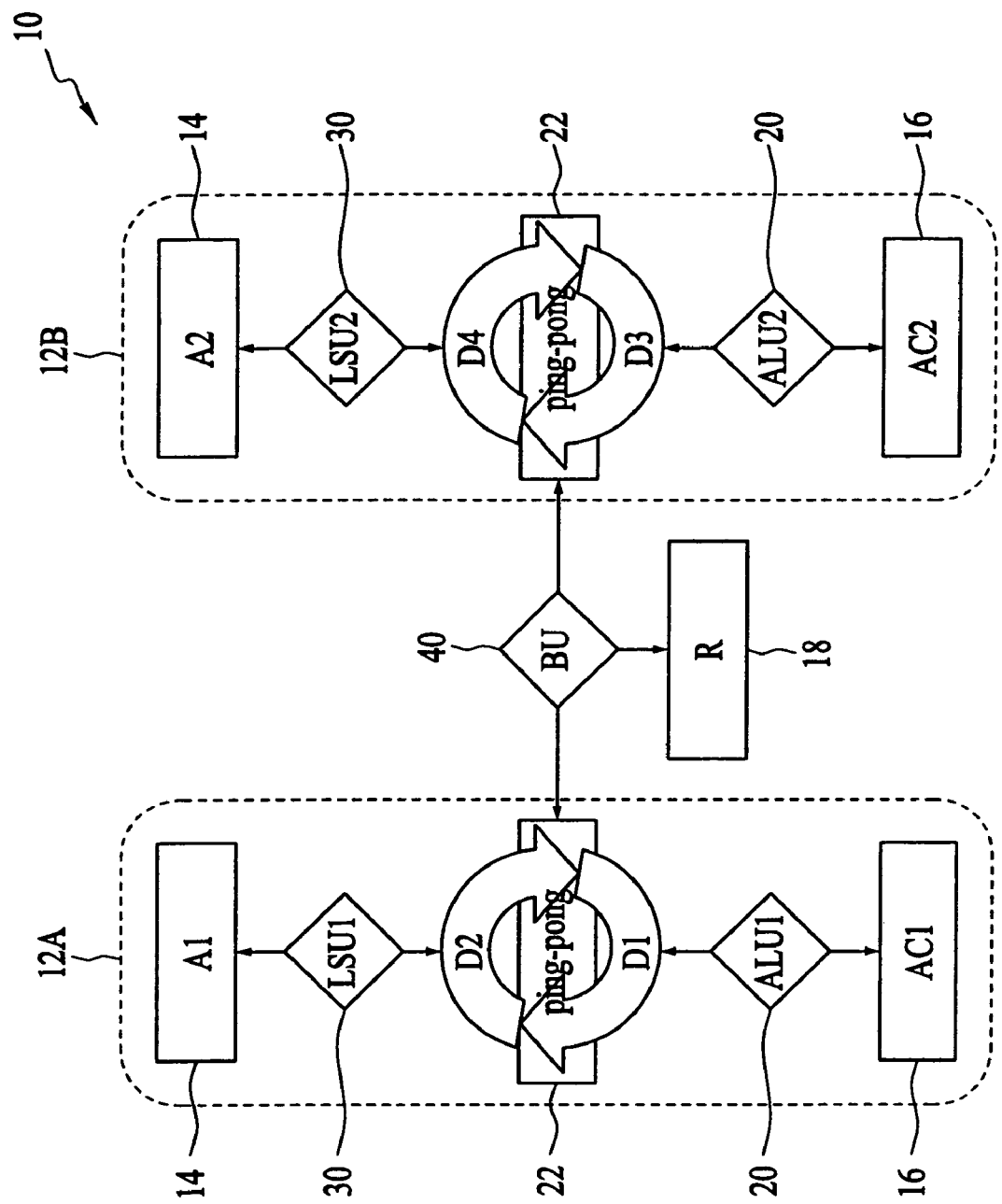
FIG. 1 is a graphic illustration showing an architecture of a Parallel Architecture Core (PAC) DSP processor.

FIG. 1 illustrates an architecture of a Parallel Architecture Core (PAC) DSP processor 10. The PAC DSP processor 10 is a five-way issue Very Long Instruction Word (VLIW), comprising two arithmetic units (ALU) 20, two load/store units (LSU) 30, and a single scalar unit (B-unit) 40. These LSUs 30 and ALUs 20 are organized into two clusters 12A, 12B, each containing a pair of both functional unit (FU) types. The B-unit (BU) 40 is placed independently, and is in charge of branch operations; it is also capable of performing simple load/store and address arithmetic. The first register files (D1, D2, D3, and D4) 22 are used to communicate across clusters 12A and 12B; only the BU 40, being able to access all first register files 22, is capable of executing such copy operations across clusters 12A, 12B. The second register files (A1, A2) 14, the third register files (AC1, AC2) 16, and the fourth register files (R) 18 are private registers, directly attached to and only accessible by the LSUs 30, ALUs 20, and BU 40, respectively. Particularly, aside from being partitioned across two clusters 12A, 12B, the first register files 22 use a so-called 'ping-pong' register file design, which is believed to achieve reduced power consumption.

The PAC DSP processor 10 features a highly partitioned register file design, wherein each cluster 12A, 12B inside the architecture contains the first register files 22 including two units, the second register files 14, and the third register files 16, which are directly connected to the LSUs 30 and ALUs 20, respectively. Each first register file 22 has only a single set of access ports, shared by the LSU 30 and ALU 20. Particularly, each VLIW contains at least two instructions and two bits field controlling the access ports to be switched between the first register files 22 and these two functional units (FU, i.e., ALUs 20 and LSUs 30) in each cluster 12A, 12B. Hence, in each operation cycle, each FU can only access its dedicated first register file 22 which is assigned by each instruction; simultaneous accesses from two different FUs to a single first register file 22 are mutually exclusive.

The rationale of this design is, of course, to lower register file port counts in order to avoid the slow access speed and high power consumption of a unified register file, but at the expense of an irregular architecture. With this design, the cross-interference between register allocation and instruction scheduling substantially increases, elevating the classical phase ordering issue in compiler code generation. Not only does the clustered design make register access across clusters an additional issue, but the switched access nature of the 'ping-pong' register files (i.e., the first register files 22) makes the details of register assignment and instruction scheduling highly dependent on each other. For example, the following short code sequence moves two constants into two virtual registers, TN1 and TN2:

| mov TN1, 1 |
|---|
| mov TN2, 2 |

These two instructions can be scheduled in parallel only if TN1 and TN2 are assigned to registers from distinct first register files 22; if both are assigned to the same one, they can only be scheduled and issued sequentially. Our current proposed solution to this scenario is to add a new pre-register allocation instruction-scheduling phase by an optimization technique called simulated annealing (SA) technique.

Figures 3, 4:
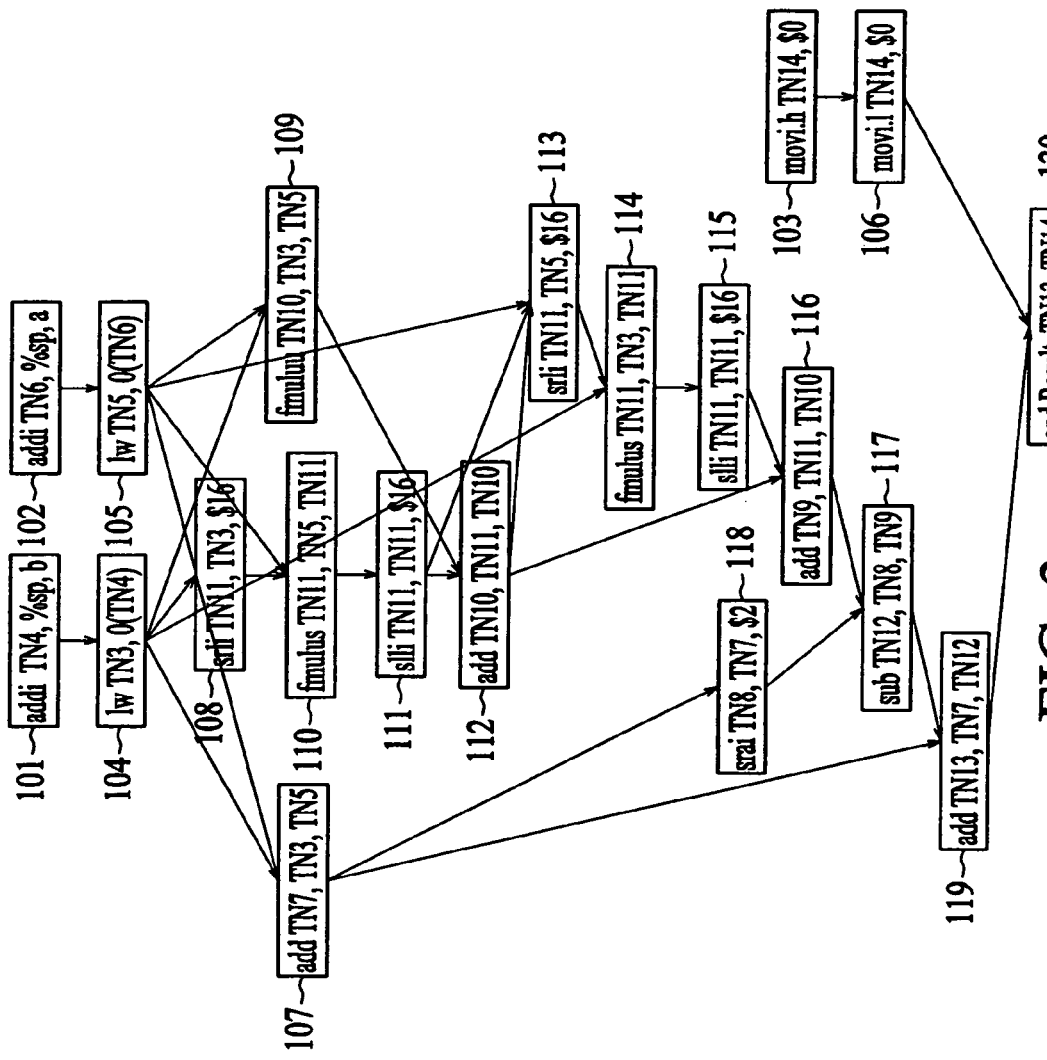

FIG. 2 to FIG. 13 illustrate a method for scheduling instructions for the PAC DSP processor 10 to perform the following C code procedure according to one embodiment of the present invention. At first, these C code procedures are translated into a pseudo-operation form and a dependency graph, as shown in FIG. 2 and FIG. 3, respectively. There are a total of 20 instructions from 101 to 120 to be executed for completing the operation of these C code procedures. An initial register file assignment map (RFA_map) is then generated randomly, as shown in FIG. 4. TN3 to TN14 in the left column represent virtual registers, and D1, A1 etc. in the right column represent the physical register files in the PAC DSP processor 10.

```
int foo(int a, int b)
{
int c = a + b;
a = (c >> 2) - a * b;
return a + c & 0xff;
}
```

Figure 5:
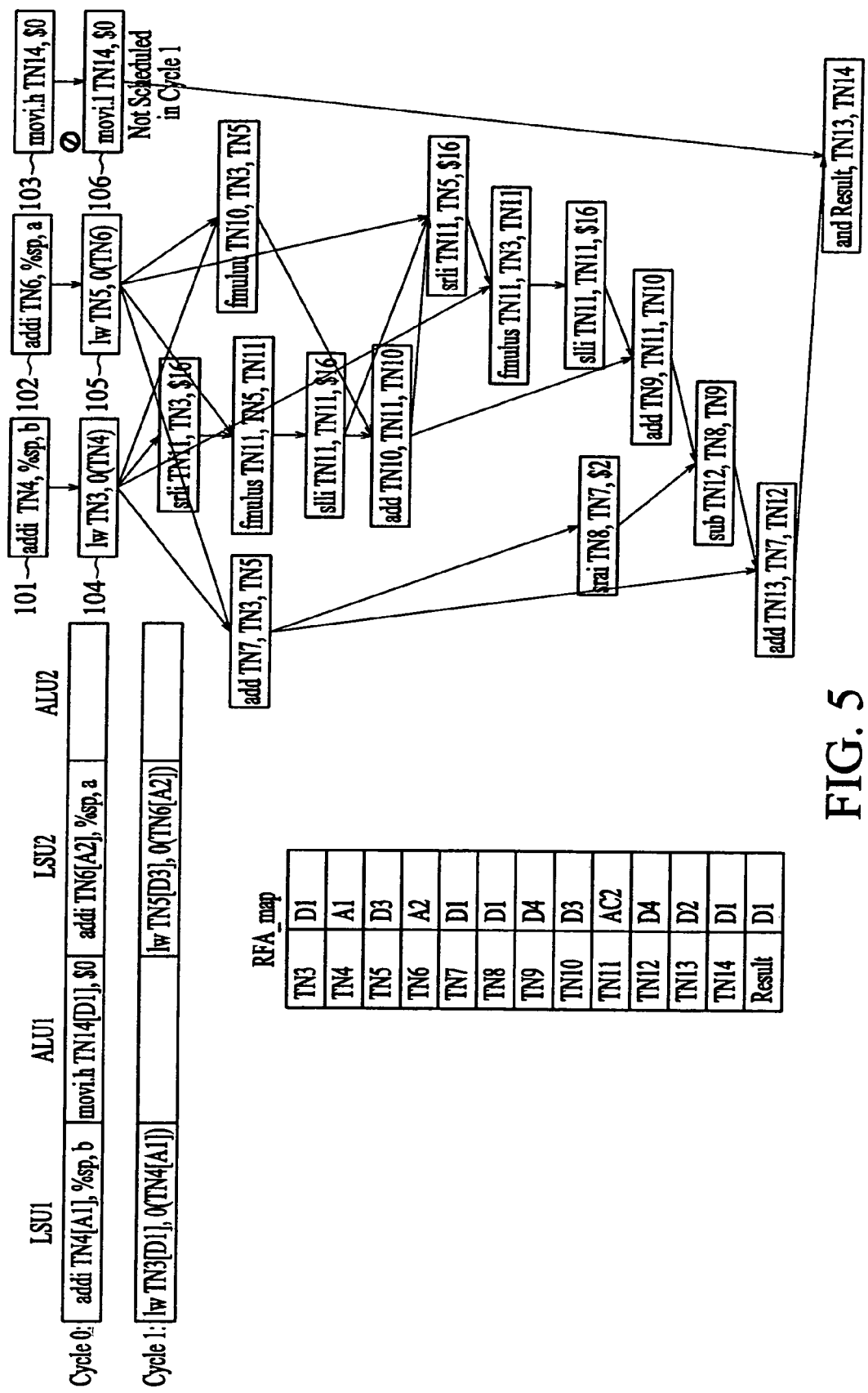

Referring to FIG. 5, the first three instructions 101, 102, and 103 are scheduled in cycle 0 directly, but the subsequent three instructions 104, 105, and 106 cannot be scheduled directly since the unit D1 of the first register 22 in the cluster 12A is already used by LSU1 to execute the instruction 104. In other words, only instruction "lw TN3, 0" 104 and 105 are scheduled in cycle 1, while the instruction 106 "movi.l TN14, $0" cannot be scheduled in cycle 1 but can be scheduled in the later cycle 2 since the operand "load word" (lw) in the instruction 104 is designed to have a higher priority than the operand "move instruction" (movi) in the instruction 106. The present method checks if the two functional units (ALU1 and LSU1) need to access the first register file 22 in one operation cycle, and schedules one of the two functional units (the LSU1 30) to access the first register file 22 before the other functional unit (the ALU 1 20) according to a predetermined priority based on type of operation and critical path status for scheduling. Particularly, the instructions 104 and 105 take three cycles to complete since it loads words from memory. The operand "movi.h" in the instruction 103 is used to move one instruction in the high-bit level of a VLIW containing at least two instructions, while the operand "movi.l" in the instruction 106 is used to move another instruction in the low-bit level of the VLIW.

Figure 6:
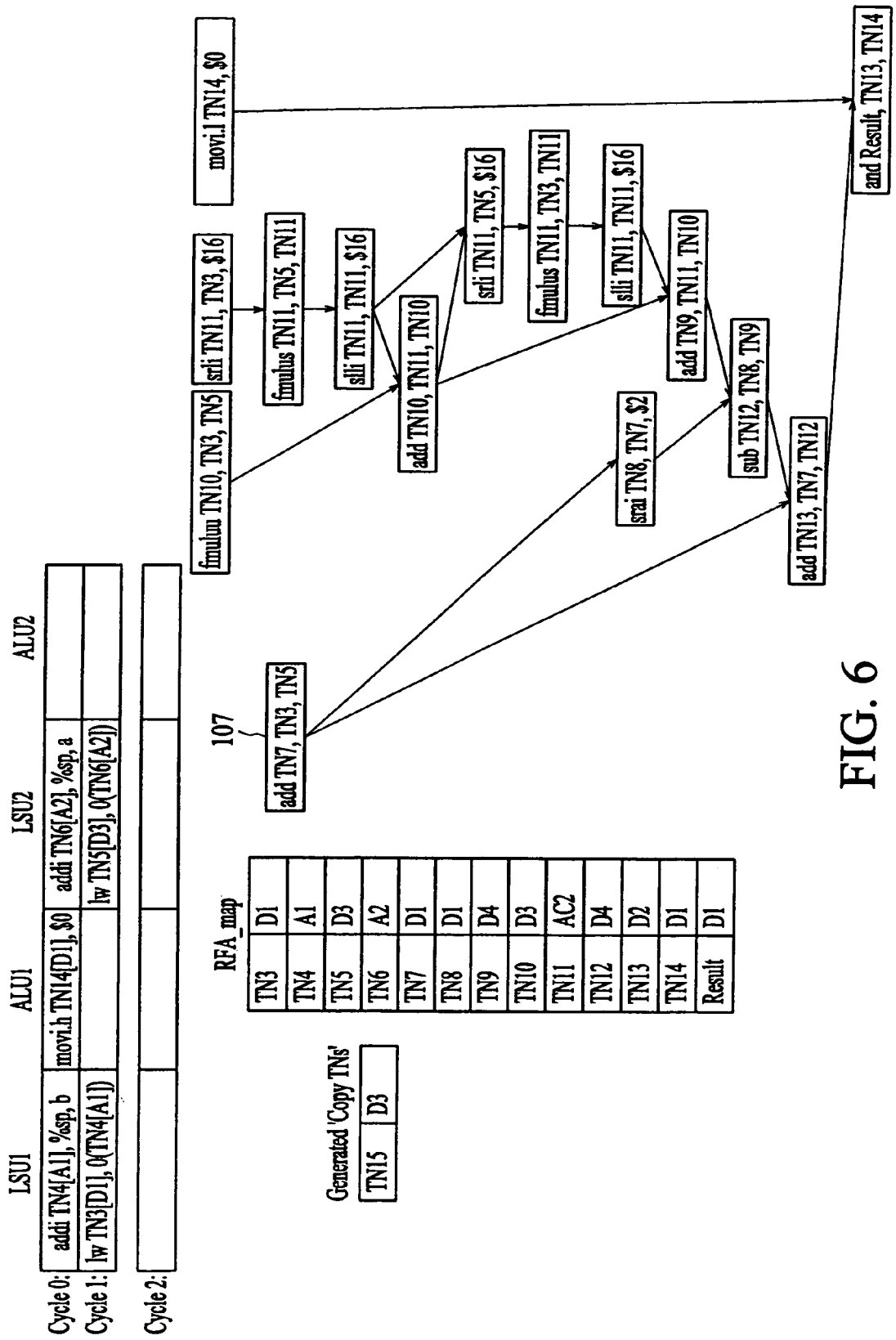
Figure 7:
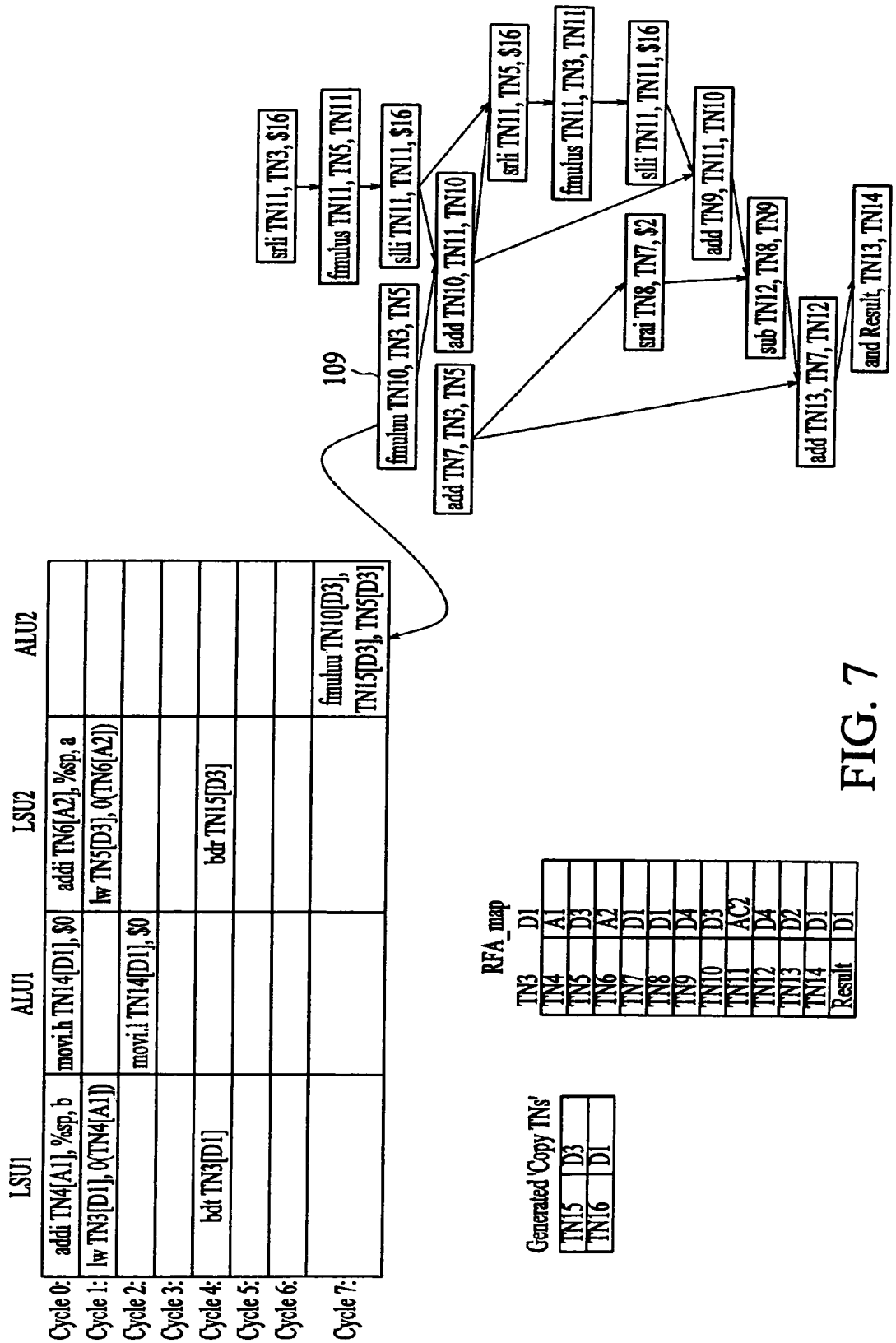

Referring to FIG. 6 and FIG. 7, another instruction 107 "add TN7, TN3, TN5" is to be scheduled, but it is not possible since the unit D1 of the first register file 22 in the cluster 12A and the unit D3 of the first register file 22 in the cluster 12B cannot be accessed simultaneously since they are in different clusters. The present method enumerates possible sequences of copy operations to transfer data between the unit D1 and the unit D3. A virtual register TN16 is generated and assigned to the unit D1 of the first register file 22 in the cluster 12A, the value in TN5 is transmitted by bdt operation and received in TN16 by bdr operation in a prior cycle 5, and TN5 and TN16 have equivalent values in register files D3 and D1, respectively. The instruction 107 is scheduled in cycle 8 after TN 16 is used to replace TN5, which will access D1 only rather than access D1 and D3 simultaneously, which is not allowed.

Figure 8:
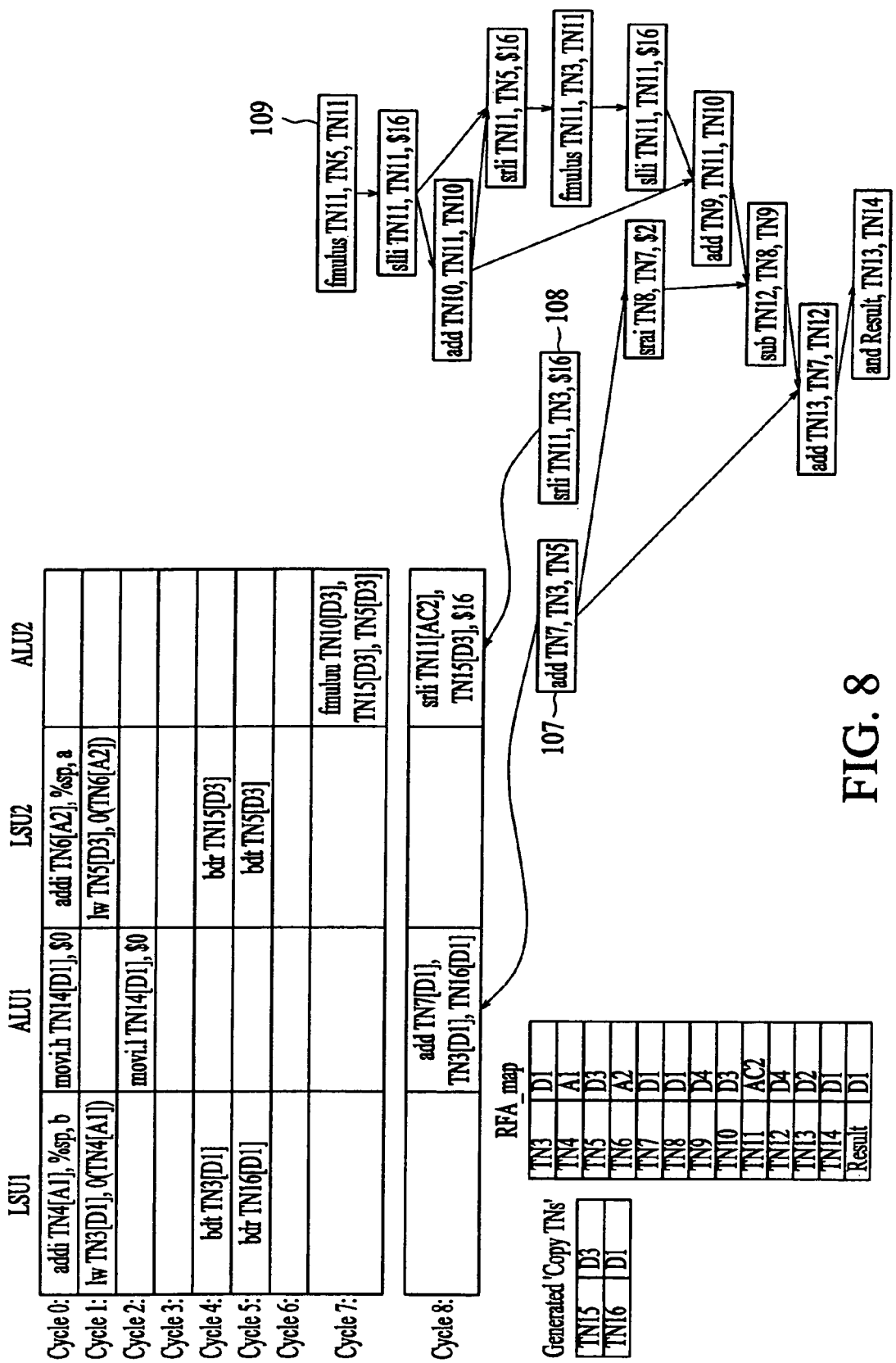

In other words, the present method checks if executing the instruction 107 needs to access data from the cluster 12A and the cluster 12B, generates a copying instruction to transfer data from the cluster 12B to the cluster 12A, and schedules the instruction 107 in cycle 8 after the copying instruction in cycle 5. Particularly, the present method checks whether there is a prior operation cycle available to perform the copying instruction consisting of the operands "bdt" and "bdr" pair; and scheduling the copying instruction in the prior operation cycle 5. Similarly, another virtual register TN15 is generated and assigned to the unit D3, the value in TN3 is transmitted by bdt operation and received in TN15 by bdr operation in cycle 4, and TN15 and TN3 have equivalent values in register files D1 and D3. This means that an operand of TN3 can be replaced with TN15, and the instruction 109 is scheduled in cycle 7 after TN15 is used to replace TN3. Further, the instruction 108 is also scheduled in cycle 8 after TN15 is used to replace TN3, as shown in FIG. 8.

Figure 9:
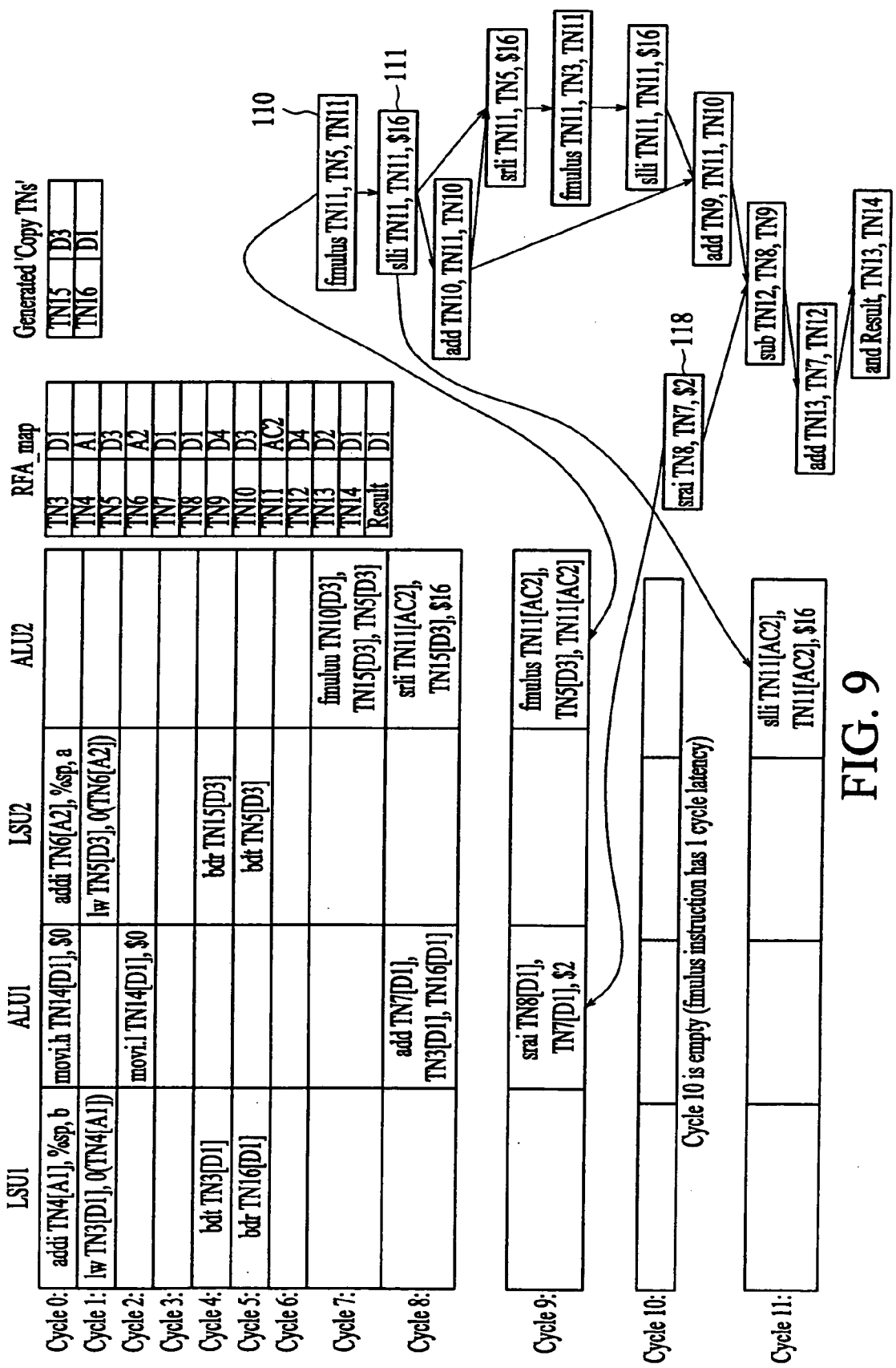
Figure 10:
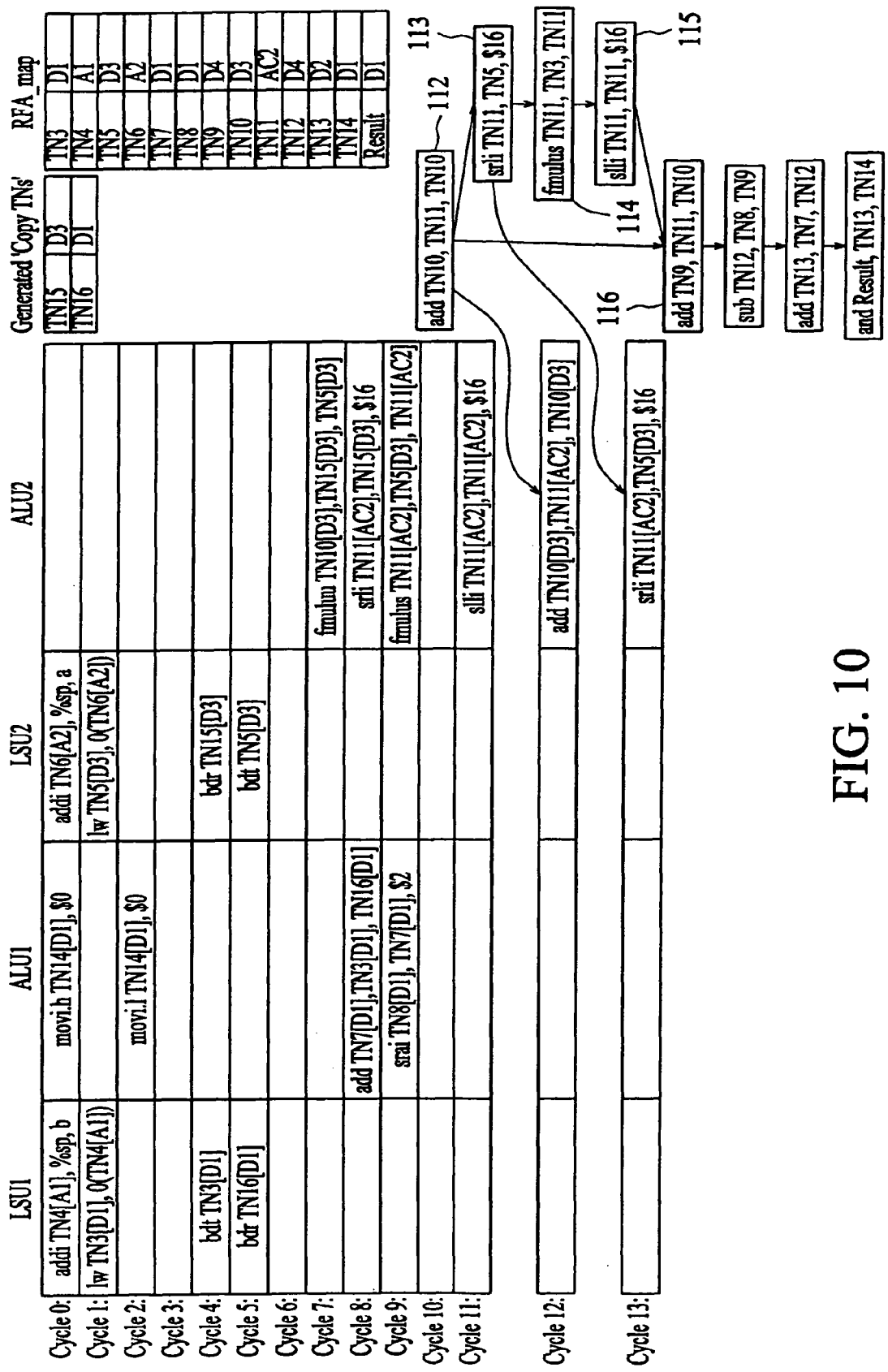
Figure 11:
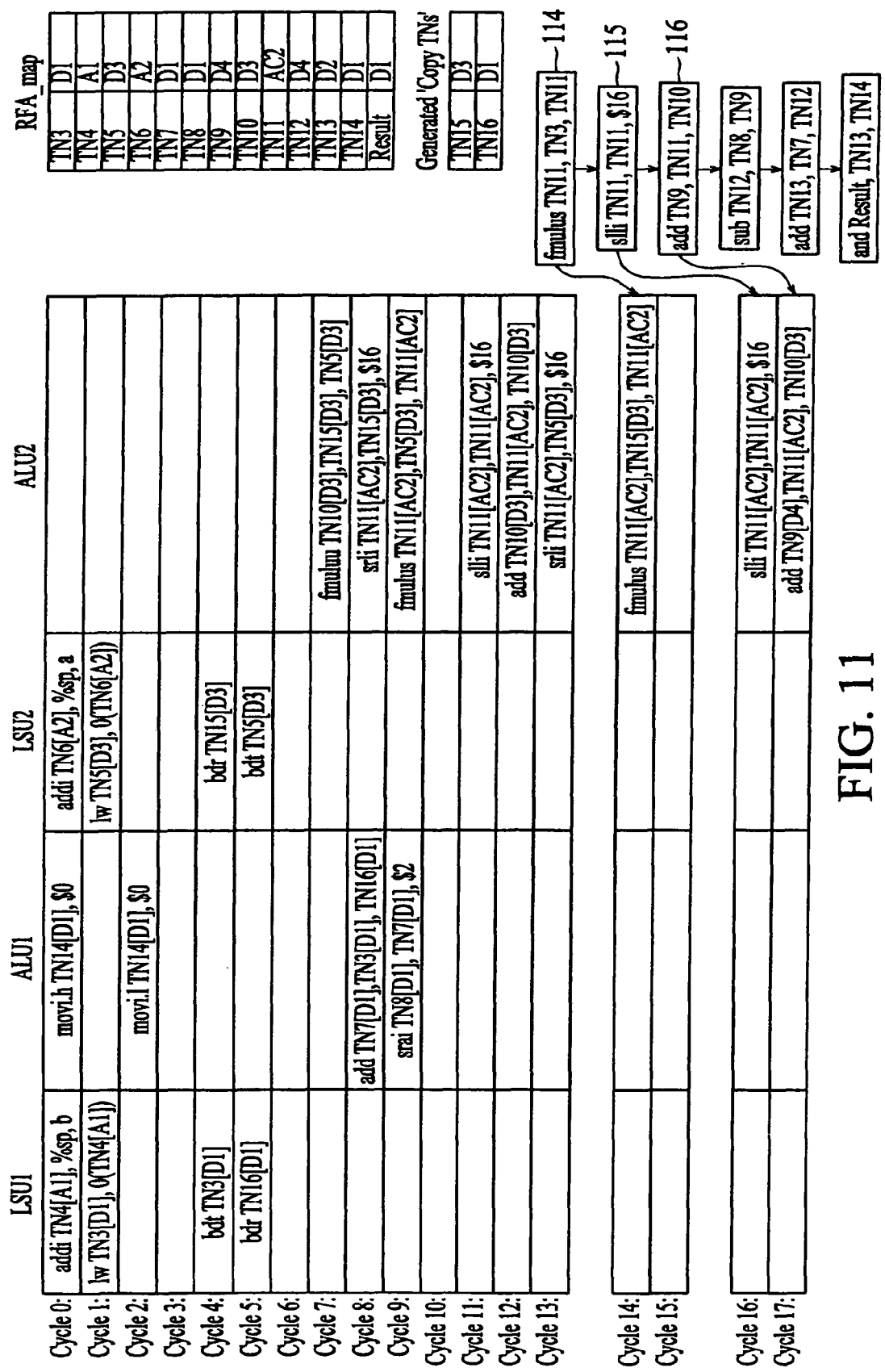

Referring to FIG. 9, instructions 118 and 110 are scheduled in cycle 9, while cycle 10 is empty since the instruction 110 "fmulus TN 11, TN5, TN 11" (multiplication of TN5 and TN11, store in TN11) has one cycle latency. Instruction 111 is scheduled in cycle 11. Subsequently, instructions 112, 113, 114, 115, and 116 are scheduled in cycles 12, 13, 14, 16, and 17 sequentially, as shown in FIG. 10 and FIG. 11.

Figure 12:
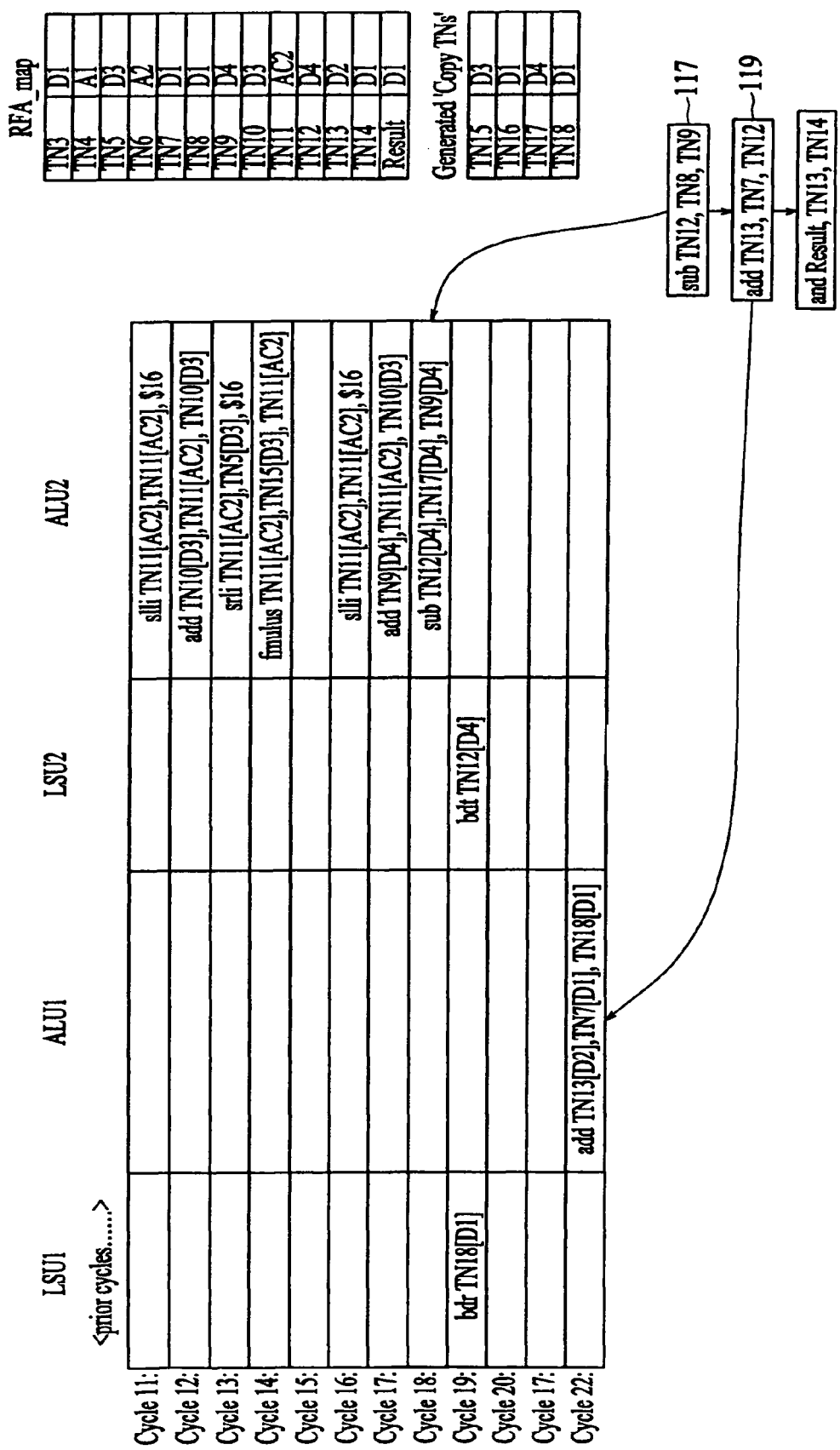

Referring to FIG. 12, instruction 117 "sub TN12, TN8, TN9" (subtraction of TN8 by TN9, and store in TN12) is to be scheduled. However, TN8 is assigned to the unit D1 in the cluster 12A, while TN9 and TN12 are assigned to the unit D4 in the cluster 12B, i.e., data source are in different clusters. A virtual register TN17 is generated and can be optionally assigned to the units D3 and D4 of the first register file 22, or the third register file (AC2) 16. The unit D3 is impossible to be assigned to TN1 7 since there will be a conflict with D4 (ping-pong constraint), the unit D4 is very suitable, and AC2 is also possible although it will need additional copy operation. Assuming TN 17 is assigned to the unit D4, and the value in TN8 is transmitted by bdt operation and received in TN17 by bdr operation in prior cycle 10, the instruction 117 is scheduled in cycle 18 after TN8 is replaced by TN17.

Subsequently, the instruction 119 "add TN13, TN7 TN12" (addition of TN7 and TN12, and store in TN13) is to be scheduled. However, TN12 is assigned to the unit D4 in cluster 12B, while TN7 and TN 13 are assigned to the units D1 and D2 in cluster 12A, i.e., data source are in different clusters. A virtual register TN 18 is generated and assigned to D1, the value in TN12 is transmitted by bdt operation and received in TN18 by bdr operation in prior cycle 19, and the instruction 119 is scheduled in cycle 22 after TN8 is replaced by TN17.

Figure 13:
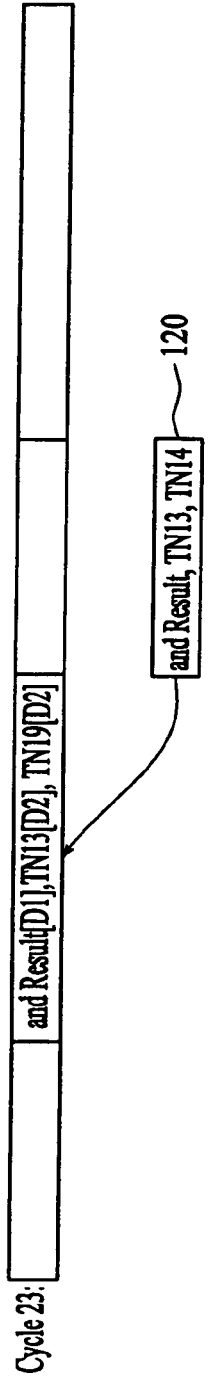

Referring to FIG. 13, a final instruction 120 is to calculate the logic (and) operation of TN13 and TN14, which are stored in a virtual register Result assigned to D1. However, TN13 and TN14 are assigned to D2 and D1 respectively, and the direct operation of the instruction is impossible since there will be a conflict (ping-pong constraint). A virtual register TN19 is generated and assigned to D2, the value in TN14 is transferred to TN19, and the instruction 120 is scheduled in cycle 23. In other words, the present method checks whether executing one instruction 120 requires data to be read from the first unit (D2) and the second unit (D1) of the first register file 22, generates a copying instruction (the one executed by ALU1 20 in cycle 22) to transfer data from the first unit (D2) to the second unit (D1) of the first register file 22, and schedules the instruction 120 in cycle 23 after the copying instruction in cycle 22. Consequently, there are a total of 23 cycles used, 9 copy operations inserted, and 5 new virtual registers generated.

Figure 14:
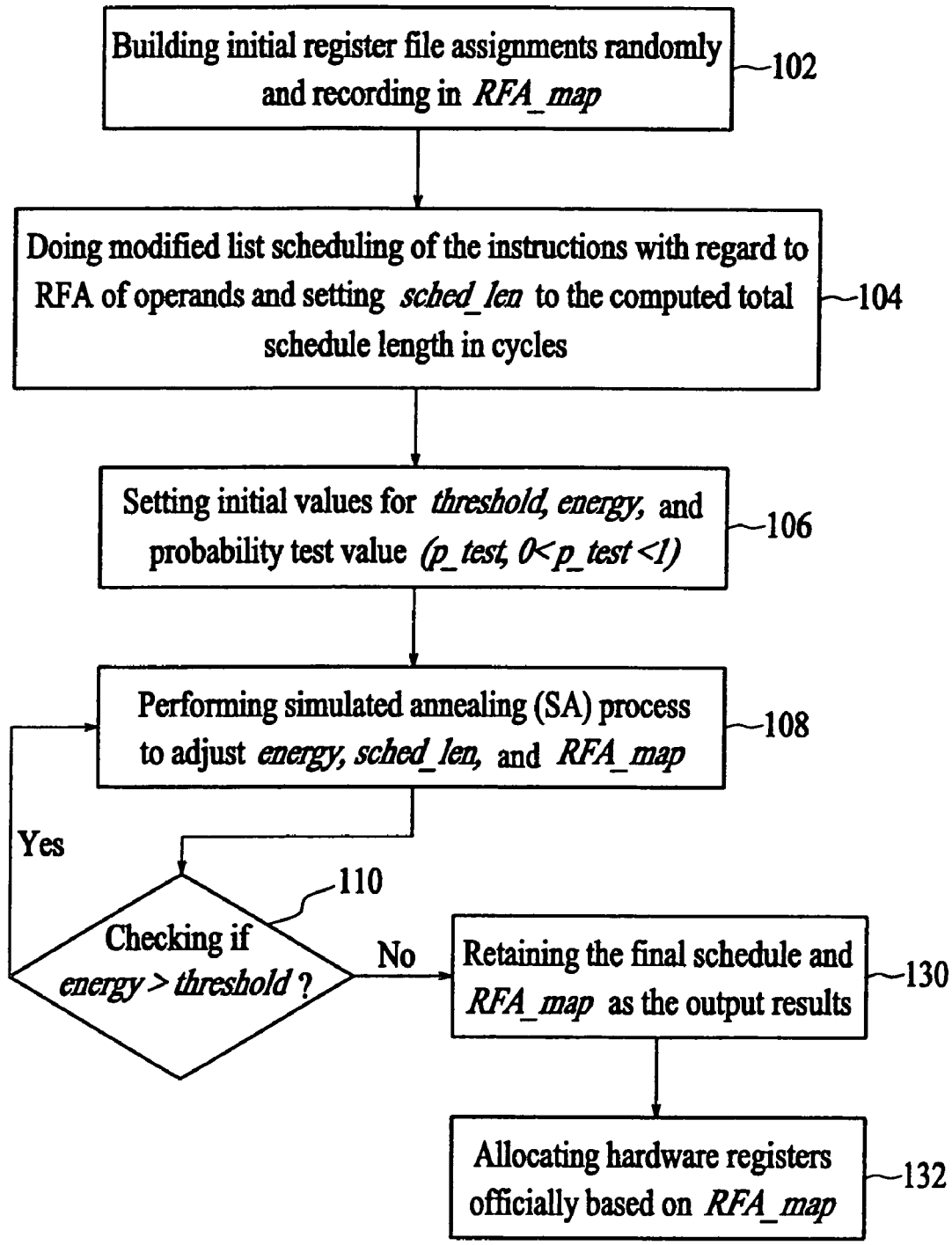
FIG. 14 and FIG. 15 are graphic illustrations showing a flow chart of a method for allocating registers according to one embodiment of the present invention.
Figure 15:
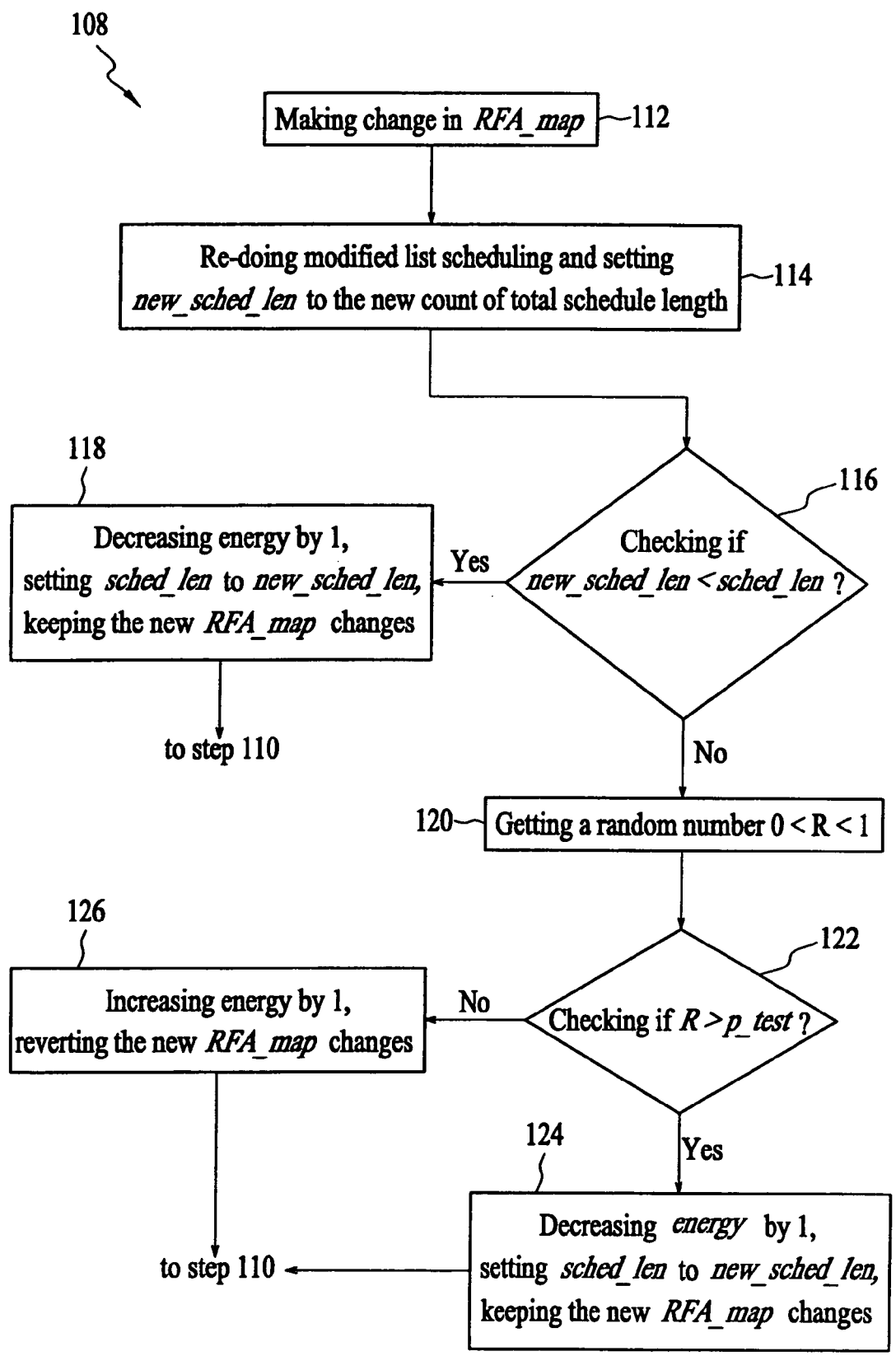

FIG. 14 and FIG. 15 illustrate flow charts of a method for allocating registers according to one embodiment of the present invention. First, the present invention performs a step 102 of building initial register file assignments randomly and records assignments in a register file assignment map (RFA_map), which randomly assigns each virtual register generated from programming codes such as those shown in FIG. 4. The present invention then performs a step 104 of doing modified list scheduling of the instructions, i.e., performing a scheduling process as shown in FIG. 5 to FIG. 13, with regard to RFA of operands, and setting a variable (sched_len) to the computed total schedule length in cycles. Subsequently, the present invention performs a step 106 of setting initial values for a threshold for a simulated annealing (SA) process, energy larger than the threshold, and probability test value (p_test, 0<p_test <1).

The present invention then proceeds with a step 108 for performing a simulated annealing process to adjust the value of the energy, the sched_len, and the RFA_map, and a step 110 is then performed to check if the value of the energy is larger than that of the threshold. On the one hand the present invention returns to the step 108 of performing a simulated annealing (SA) process to adjust energy, sched_len, and RFA_map if the value of the energy is larger than that of the threshold; on the other hand the present invention proceeds with a step 130 of retaining the final schedule and RFA_map as the output results. Subsequently, the present invention proceeds with a step 132 of allocating hardware registers officially based on the RFA_map, i.e., to assign the overall virtual register TN3 to TN19 to the hardware register files 22, 14, and 16 in the processor 10.

Referring to FIG. 15, the SA process in step 108 is divided into several sub-steps. The SA process first performs a step 112 of making at least one change in the RFA_map, which randomly chooses a virtual register and assigns it to a different register file in the processor 10. With the new RFA assignment change, a step 114 is performed for re-doing modified list scheduling (i.e., performing a second scheduling process) and setting a new_sched_len to the new cycle count of total schedule length. Subsequently, a step 116 is performed to check whether the new_sched_len (the operation cycles of the second scheduling process) is smaller than the sched_len (the operation cycles of the first scheduling process). A step 118 is performed for decreasing the energy by 1, setting the sched_len to the new_sched_len, and keeping the new RFA_map changes if the new_sched_is smaller than the sched_len. Otherwise, a step 120 is performed for generating a random number R between 0 and 1. Subsequently, a step 122 is performed for checking if R is larger than p_test. A step 124 is performed for decreasing energy by 1, setting the sched_len to the new_sched_len, and keeping the new RFA_map changes if R is larger than p_jest, and then returns to step 110. Otherwise, a step 126 is performed for increasing energy by 1 and reverting the new RFA_map changes, and then returns to step 110.

The above-described embodiments of the present invention are intended to be illustrative only. Numerous alternative embodiments may be devised by those skilled in the art without departing from the scope of the following claims.

We claim:

1. A method for allocating registers for clustered digital signal processors that have a plurality of clusters, each of the plurality of clusters having at least two functional units, a first register file, a second register file and a third register file, the first register file having a first unit, a second unit and one single set of access ports shared by the functional units, the method comprising:

generating a plurality of instructions for programming codes;

assigning a plurality of virtual registers to each of the first register file and the second register file and the third register file so as to build an initial register file assignment map;

performing a simulated annealing process to the register file assignment map, the step of performing comprising:

making at least one change in the register file assignment map;

performing a schedule process to calculate a temporary schedule with a temporary length for the plurality instructions, wherein the schedule process comprises determining whether an execution of the instruction requires data to be read from the first and second units of the first register file is true, generating at least one additional virtual register assigned to the second unit of the first register file so as to receive data transferred from the first unit of the first register file, generating a copying instruction so as to transfer data from the first unit to the second unit of the first register file, determining when a prior operation cycle is available to perform the step of generating the copying instruction, scheduling the copying instruction in the prior operation cycle, and scheduling the instruction after the generated copying instruction; and allocating the plurality of virtual registers to the first, second and third register files according to the register assignment map.

2. The method of claim 1, the step of performing the schedule process comprising:

determining whether the two functional units are required to access the first register file in an operation cycle; and scheduling one of the two functional units to access the first register file before the other functional unit according to a predetermined priority.

* * * * *